(12) United States Patent
Butler

(10) Patent No.: US 11,725,420 B2
(45) Date of Patent: *Aug. 15, 2023

(54) COLLINEAR LATCH AND LOCK

(71) Applicant: Rockwell Collins, Inc., Cedar Rapids, IA (US)

(72) Inventor: Logan Butler, Lynnwood, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,802

(22) Filed: Jun. 1, 2022

(65) Prior Publication Data

US 2022/0290464 A1     Sep. 15, 2022

Related U.S. Application Data

(63) Continuation of application No. 16/207,866, filed on Dec. 3, 2018, now Pat. No. 11,377,877.

(51) Int. Cl.
| | |
|---|---|
| *E05B 63/00* | (2006.01) |
| *E05B 63/06* | (2006.01) |
| *E05C 19/06* | (2006.01) |
| *B64C 1/14* | (2006.01) |

(52) U.S. Cl.
CPC ........ *E05B 63/0017* (2013.01); *B64C 1/1423* (2013.01); *E05B 63/0065* (2013.01); *E05B 63/06* (2013.01); *E05C 19/06* (2013.01); *Y10T 292/06* (2015.04); *Y10T 292/096* (2015.04); *Y10T 292/097* (2015.04); *Y10T 292/098* (2015.04); *Y10T 292/0962* (2015.04); *Y10T 292/0969* (2015.04); *Y10T 292/0977* (2015.04); *Y10T 292/11* (2015.04)

(58) Field of Classification Search
CPC .............. Y10T 292/06; Y10T 292/096; Y10T 292/0962; Y10T 292/0969; Y10T 292/097; Y10T 292/0977; Y10T 292/098; Y10T 292/11; E05B 63/0017; E05B 63/0065; E05B 13/004; E05B 15/0073; E05B 59/00; E05B 63/06; E05C 19/06; E05C 1/16; E05C 1/04; B64C 1/1423

See application file for complete search history.

(56) References Cited

U.S. PATENT DOCUMENTS

| | | | |
|---|---|---|---|
| 300,334 | A | 6/1884 | Wüest |
| 390,795 | A | 10/1888 | Neu |
| 813,119 | A | 2/1906 | Smith |
| 1,262,435 | A | 4/1918 | Berg |
| 1,361,317 | A | 12/1920 | Sigmund et al. |
| 1,816,134 | A | 7/1931 | Wilson |

(Continued)

*Primary Examiner* — Christine M Mills
*Assistant Examiner* — Faria F Ahmad
(74) *Attorney, Agent, or Firm* — Suiter Swantz pc llo

(57) ABSTRACT

A collinear latching and locking system is disclosed. In embodiments, the system includes a strike with a lock bolt disposed at or defined by an end of the strike. The system further includes a latch pawl configured to surround at least a portion of the strike. The strike and the latch pawl are configured to actuate linearly along the same axis. In this regard, the strike and the latch pawl have a collinear configuration and actuation path. The system further includes a latch cam configured to actuate the latch pawl from a latched position to an unlatched position when the latch cam is turned.

17 Claims, 13 Drawing Sheets

(56) References Cited

U.S. PATENT DOCUMENTS

| | | |
|---|---|---|
| 1,817,939 A | 8/1931 | Joseph |
| 1,852,008 A | 4/1932 | Grund |
| 1,895,892 A | 1/1933 | Moore |
| 1,908,958 A | 5/1933 | Coffron |
| 1,909,210 A | 5/1933 | Dorr |
| 1,909,361 A | 5/1933 | Kaimer |
| 2,169,743 A | 8/1939 | Schlage |
| 2,219,186 A | 10/1940 | Hornfeck |
| 2,293,645 A | 8/1942 | Morris |
| 2,468,969 A | 5/1949 | Galey |
| 2,503,315 A | 4/1950 | Dean |
| 2,519,808 A | 8/1950 | Weare et al. |
| 2,586,066 A | 2/1952 | Larson |
| 2,673,758 A | 3/1954 | Schlage |
| 2,718,421 A | 9/1955 | Slopa et al. |
| 2,775,475 A | 12/1956 | Julius |
| 2,937,897 A | 5/1960 | Soderberg |
| 3,175,376 A | 3/1965 | Cantwell |
| 3,586,361 A | 6/1971 | Ohno |
| 3,751,086 A | 8/1973 | Geringer |
| 3,770,306 A | 11/1973 | Nystrom |
| 3,934,435 A | 1/1976 | Gresham |
| 3,948,066 A | 4/1976 | Solovieff |
| 3,953,991 A | 5/1976 | Grossman |
| 4,058,333 A | 11/1977 | Roe et al. |
| 4,268,075 A | 5/1981 | Allenbaugh |
| 4,372,594 A | 2/1983 | Gater |
| 4,662,666 A | 5/1987 | Wimmer |
| 4,725,086 A | 2/1988 | Shen |
| 4,729,585 A | 3/1988 | Lin |
| 4,729,586 A | 3/1988 | Fang |
| 4,752,090 A | 6/1988 | Lin |
| 4,767,140 A | 8/1988 | Lin |
| 4,895,404 A | 1/1990 | Toledano |
| 4,988,133 A | 1/1991 | Shih |
| 5,029,912 A | 7/1991 | Gotanda |
| 5,152,558 A | 10/1992 | Smith et al. |
| 5,257,837 A | 11/1993 | Bishop |
| 5,280,974 A | 1/1994 | Weintroub |
| 5,364,138 A | 11/1994 | Dietrich et al. |
| 5,378,029 A | 1/1995 | Hoffeins |
| 5,529,351 A | 6/1996 | Donald |
| 5,562,314 A | 10/1996 | Wheatland et al. |
| 5,570,912 A | 11/1996 | Mullich |
| 5,690,372 A | 11/1997 | Jans |
| 5,816,629 A | 10/1998 | Donald |
| 5,927,769 A | 7/1999 | Pullen |
| 5,957,510 A | 9/1999 | Kuo |
| 6,186,562 B1 | 2/2001 | Huang |
| 6,357,806 B1 | 3/2002 | Saku |
| 6,474,120 B1 | 11/2002 | Wadsworth et al. |
| 6,536,812 B1 | 3/2003 | Winardi |
| 6,764,112 B2 | 7/2004 | Lan-Shi et al. |
| 7,267,378 B2 * | 9/2007 | Drumm ................ E05C 19/163 292/DIG. 60 |
| 8,001,813 B1 | 8/2011 | Turnbo |
| 8,393,650 B2 | 3/2013 | Eliot |
| 10,006,226 B2 | 6/2018 | Hill et al. |
| 10,233,673 B2 | 3/2019 | Ramakrishna |
| 11,293,199 B1 | 4/2022 | Vetter et al. |
| 2002/0008390 A1 | 1/2002 | Markbreit |
| 2004/0004360 A1 | 1/2004 | Huang et al. |
| 2004/0232705 A1 | 11/2004 | Hahn |
| 2007/0007775 A1 * | 1/2007 | Gallas .................... E05C 19/16 292/251.5 |
| 2008/0012352 A1 | 1/2008 | Eenigenburg et al. |
| 2008/0072635 A1 | 3/2008 | Chang et al. |
| 2009/0064737 A1 | 3/2009 | Fan |
| 2009/0195000 A1 | 8/2009 | Howey |
| 2009/0315341 A1 | 12/2009 | Willcox |
| 2011/0236126 A1 | 9/2011 | Eliot |
| 2012/0167646 A1 | 7/2012 | Sharma et al. |
| 2012/0299314 A1 | 11/2012 | Jiang |
| 2014/0319850 A1 | 10/2014 | Berger et al. |
| 2015/0225983 A1 | 8/2015 | Alzingre et al. |
| 2018/0274264 A1 | 9/2018 | Raatikainen |
| 2018/0355645 A1 | 12/2018 | Laverty et al. |
| 2019/0234112 A1 | 8/2019 | Hong et al. |
| 2019/0352935 A1 | 11/2019 | Cox |
| 2021/0230900 A1 * | 7/2021 | Swartz ................ E05B 47/0038 |

* cited by examiner

COLLINEAR LATCH AND LOCK

CROSS-REFERENCE TO RELATED APPLICATIONS

The present application claims the benefit of U.S. patent application Ser. No. 16/207,866, filed on Dec. 3, 2018, titled "COLLINEAR LATCH AND LOCK", naming Logan Butler as inventor, which is incorporated herein by reference in the entirety.

BACKGROUND

Door securing devices, such as latches and/or locks, are often installed on doors, gates, lids, or the like. In many cases, a latch and a lock are simultaneously employed. For example, a door lock may be installed above or below a door latch. In such configurations, separate lock and latch sockets and additional components are required to install the door lock and the door latch. Moreover, having separate latches and locks may require additional wiring for door frames that include switches (e.g., for detecting lock/latch status, turning on/off lights, etc.) that can be activated when the door is in a latched and/or locked state. Consequently, there is a need for co-located latching and locking mechanisms.

SUMMARY

In one aspect, embodiments of the inventive concepts disclosed herein are directed to a door securing device that employs a collinear latching and locking mechanism. In embodiments, the door securing device includes a strike with a lock bolt disposed at or defined by an end of the strike. The door securing device further includes a latch pawl configured to surround at least a portion of the strike. The strike and the latch pawl are configured to actuate linearly along the same axis. In this regard, the strike and the latch pawl have a collinear configuration and actuation path. The door securing device further includes a housing that defines a cavity configured to house at least a portion of the strike and at least a portion of the latch pawl. The housing may include at least one spring disposed at least partially within the housing and configured to bias the latch pawl towards a latched position. The housing may further include a latch cam at least partially disposed within the housing and configured to actuate the latch pawl towards an unlatched position when the latch cam is turned. The door securing device may include a handle coupled to the latch cam and configured to turn the latch cam. The door securing device may further include a lock trigger coupled to the strike for linearly actuating the strike between locked and unlocked positions.

In another aspect, embodiments of the inventive concepts disclosed herein are directed to an aircraft lavatory door system that employs the door securing device described herein. In embodiments, the aircraft lavatory door system includes an aircraft lavatory door equipped with the door securing device described herein.

In another aspect, embodiments of the inventive concepts disclosed herein are more generally directed to a system for latching and locking. In embodiments, the system includes a strike with a lock bolt disposed at or defined by an end of the strike. The system further includes a latch pawl configured to surround at least a portion of the strike. The strike and the latch pawl are configured to actuate linearly along the same axis. In this regard, the strike and the latch pawl have a collinear configuration and actuation path. The system further includes a latch cam configured to actuate the latch pawl from a latched position to an unlatched position when the latch cam is turned.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
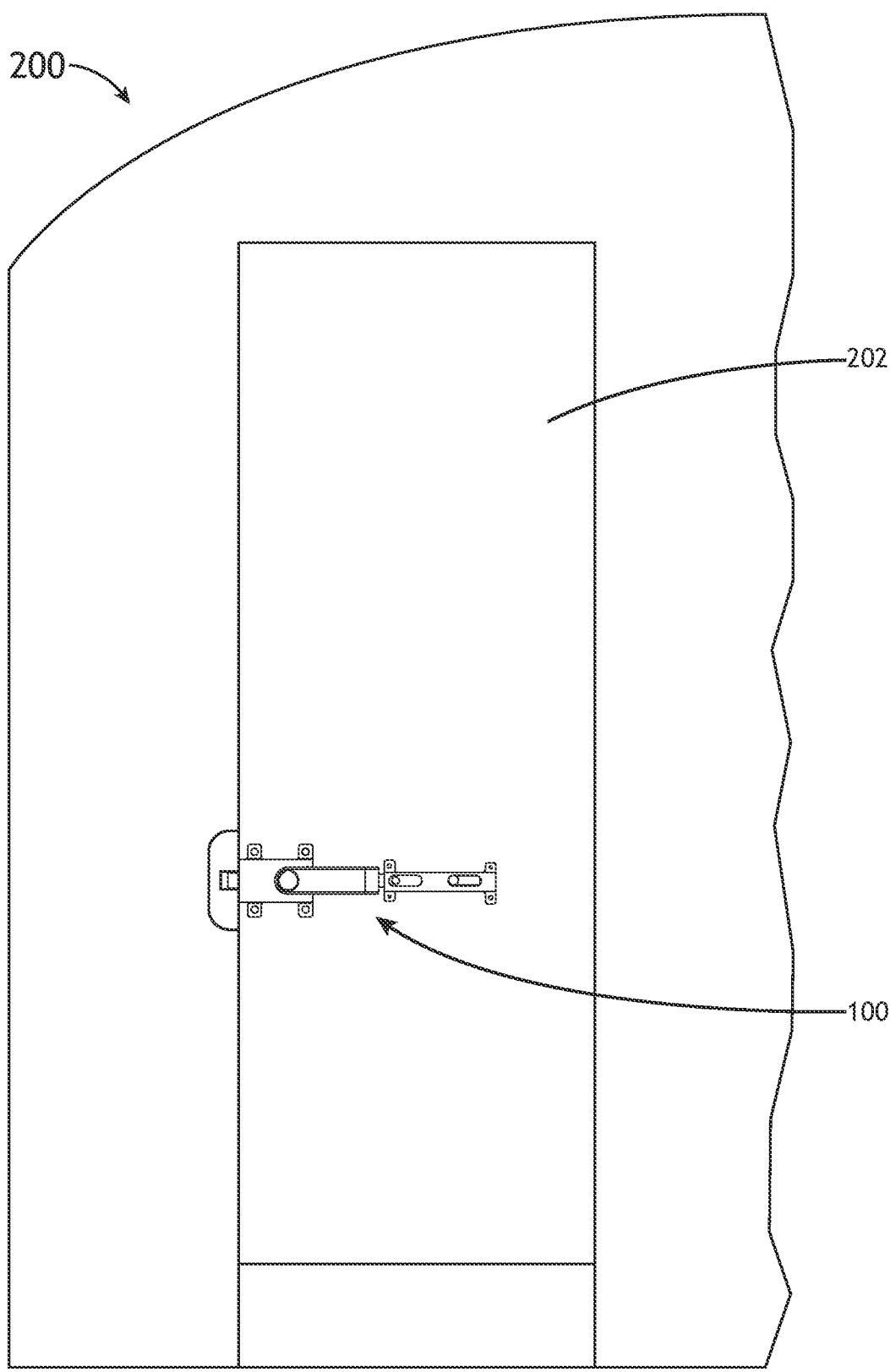
FIG. 1 is a perspective view of an example environment (e.g., an aircraft lavatory environment) in which a door securing device that includes a collinear latching and locking mechanism may be employed, in accordance with an example embodiment of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to door securing devices and systems that employ collinear latching and locking mechanisms. In embodiments, a door securing device/system includes a strike with a lock bolt disposed at or defined by an end of the strike. The device/system further includes a latch pawl configured to surround at least a portion of the strike, where the strike and the latch pawl are configured to actuate linearly along the same axis. In this regard, the strike and the latch pawl are co-located and have a collinear configuration and actuation path. Although the lock bolt and the latch pawl are co-located and collinear, the lock bolt and the latch pawl may be independently operable. In some embodiments, the strike/lock bolt, when in a locked state, can be configured to prevent the latch pawl from being actuated or at least configured to limit the motion of the latch pawl. In some embodiments, the device/system is configured so that a switch disposed in a door frame (e.g., in a latch/lock socket) is only operated while in a locked state. In some embodiments, the device/system features a magnetic detent system (e.g., a touchless magnetic detent) that allows for smooth and quiet operation of the lock while providing positive feedback of the state of the lock. Example embodiments of the door securing device/system are described in further detail below with reference to FIGS. 1 through 13B.

FIG. 1 illustrates an example environment 200 (e.g., an aircraft lavatory) that includes a door 202 equipped with a door securing device 100 that employs a collinear latching and locking mechanism. In embodiments, the lavatory door 202 may be a swinging door or folding door that can be locked/latched with the door securing device 100 when the door 202 is closed. Although example embodiments of the present disclosure are shown and described in an aviation environment, the inventive concepts of the present disclosure may be implemented in other settings. Furthermore, although a "door" securing device/system is described through this disclosure, it is to be understood that the device/system embodiments described herein can be configured to secure other structures. For example, the embodiments of the present disclosure may be incorporated into securing devices for doors, hatches, lids, or other barrier/enclosure devices of any air, land, or water-based vehicle, permanent structure (e.g., building doors/enclosures), or personal equipment (e.g., storage containers, and the like). In the interest of simplicity and to most clearly define the inventive concepts of the present disclosure, embodiments may be described throughout the present disclosure in an aircraft lavatory environment. However, these references are not to be regarded as limiting.

Figure 2:
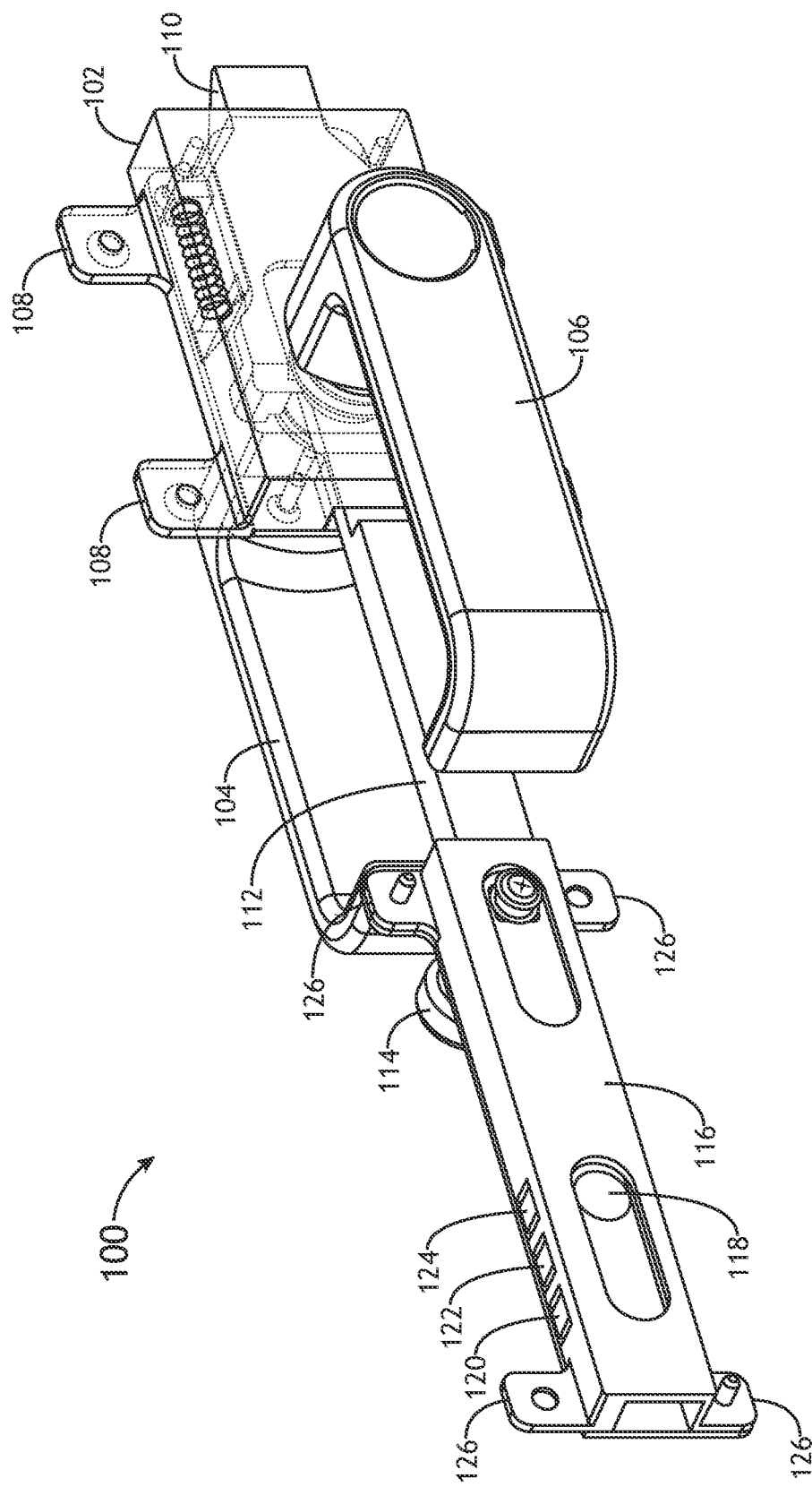
FIG. 2 is a perspective view of the door securing device in a locked state, in accordance with an example embodiment of this disclosure.
Figure 3:
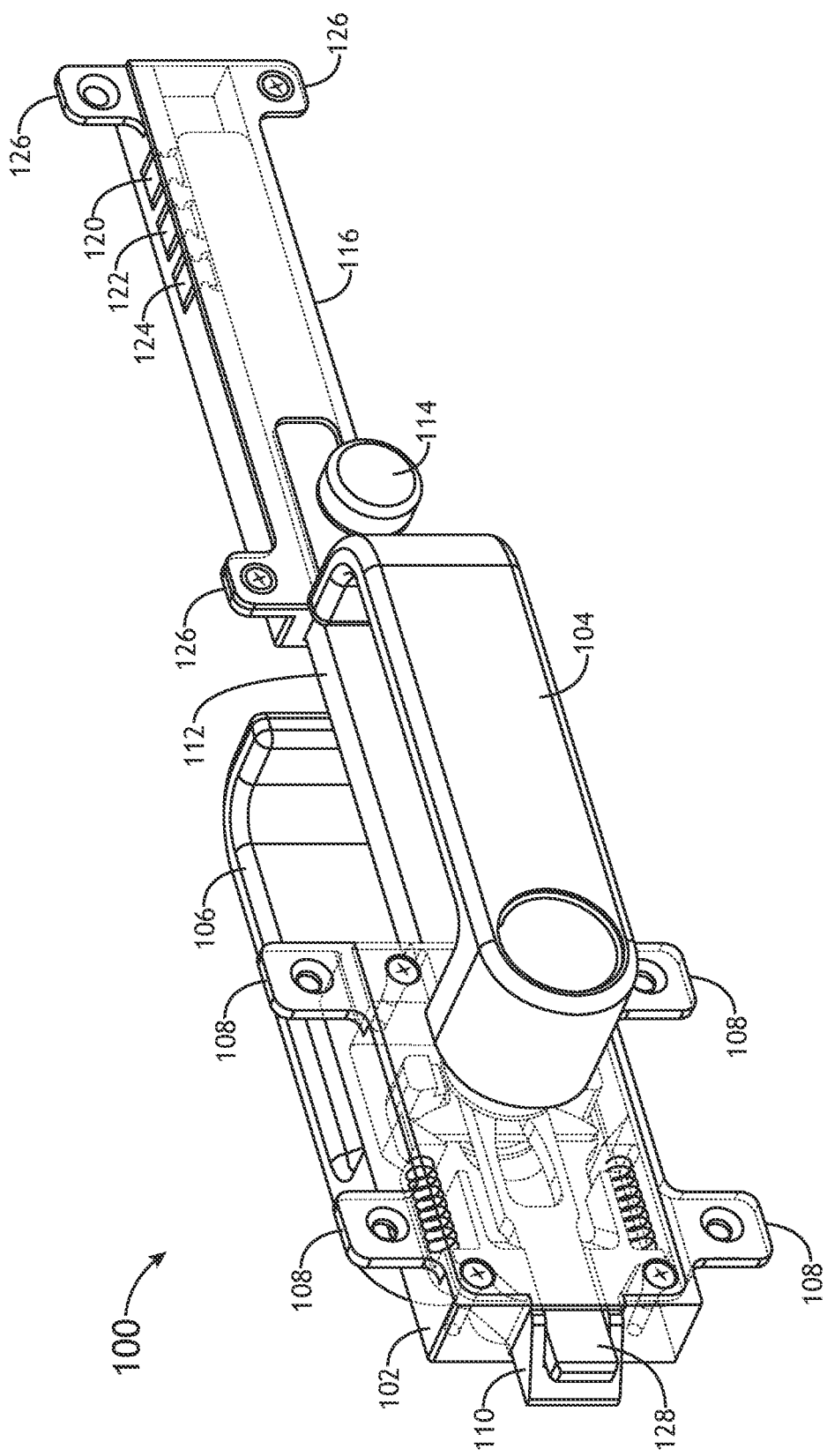
FIG. 3 is another perspective view of the door securing device in a locked state, in accordance with an example embodiment of this disclosure.

The door securing device 100 is illustrated in FIGS. 2 through 12, in accordance with one or more example embodiments. As shown in FIGS. 2 and 3, the door securing device 100 includes a strike 112 with a lock bolt 128 disposed at or defined by an end of the strike 112. The door securing device 100 further includes a latch pawl 110 configured to surround at least a portion of the strike 112 and/or lock bolt 128. The strike 112 and the latch pawl 110 are configured to actuate linearly along the same axis. In this regard, the strike 112 and the latch pawl 110 are co-located and have a collinear configuration and actuation path. As shown in FIG. 3, the latch pawl 110 may define a cavity that the strike 112 and/or lock bolt 128 actuates within, along the same axis of motion as the latch pawl 110 itself. Despite being co-located and having collinear actuation paths, the latch pawl 110 and the lock bolt 128 may be independently operable. For example, the latch pawl 110 may be actuated from a latched position to an unlatched position, or vice versa, without moving the lock bolt 128; similarly, the lock bolt 128 may be actuated from a locked position to an unlocked position, or vice versa, without moving the latch pawl 110.

The door securing device 100 includes a housing 102 that defines a cavity configured to house at least a portion of the latch pawl 110 and at least a portion of the strike 112 and/or lock bolt 128. In some embodiments, the housing 102 includes a plurality of fastening ports 108 for securing the housing 102 to the door 202. The fastening ports 108 may all extend outwardly from the housing 102, for example, as shown in FIGS. 2 through 7. Alternatively, one or more of the fastening ports 108 may be disposed within the housing 102. In embodiments, the door securing device 100 further includes a rear housing structure 116 (or rear portion of housing 102) that defines a longitudinal cavity configured to house a rear portion of the strike 112. The rear housing structure 116 (or rear portion of housing 102) can include a lock detent system for transitioning the strike 112 between locked and unlocked positions and for stabilizing the strike 112/lock bolt 128 in the locked position or the unlocked position. The rear housing structure 116 (or rear portion of housing 102) can also include a plurality of fastening ports 126 for securing the rear housing structure 116 (or rear portion of housing 102) to the door 202. The fastening ports 126 may all extend outwardly from the rear housing structure 116 (or rear portion of housing 102), for example, as shown in FIGS. 2 through 7. Alternatively, one or more of the fastening ports 126 may be disposed within the rear housing structure 116 (or rear portion of housing 102).

Figure 4:
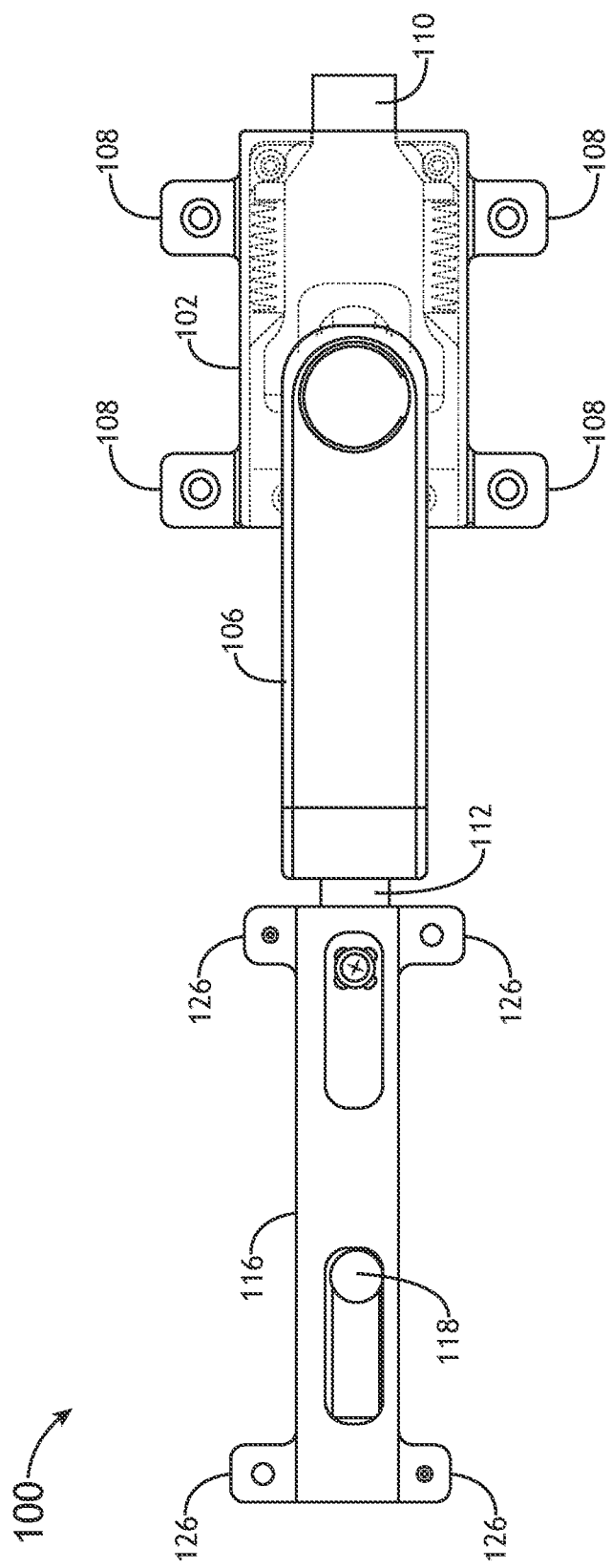
FIG. 4 is a side elevation view of the door securing device in a locked state, in accordance with an example embodiment of this disclosure.
Figure 5:
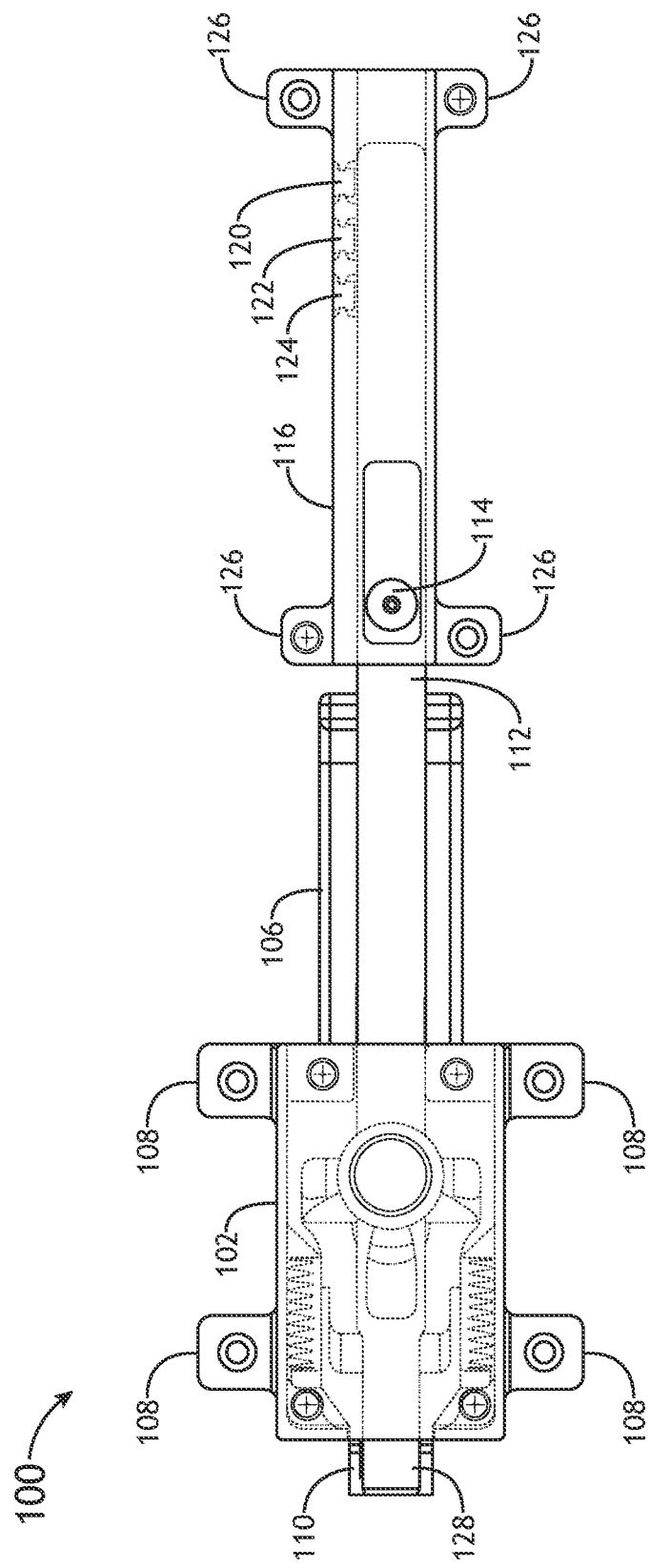
FIG. 5 is another side elevation view of the door securing device in a locked state, in accordance with an example embodiment of this disclosure.
Figure 6:
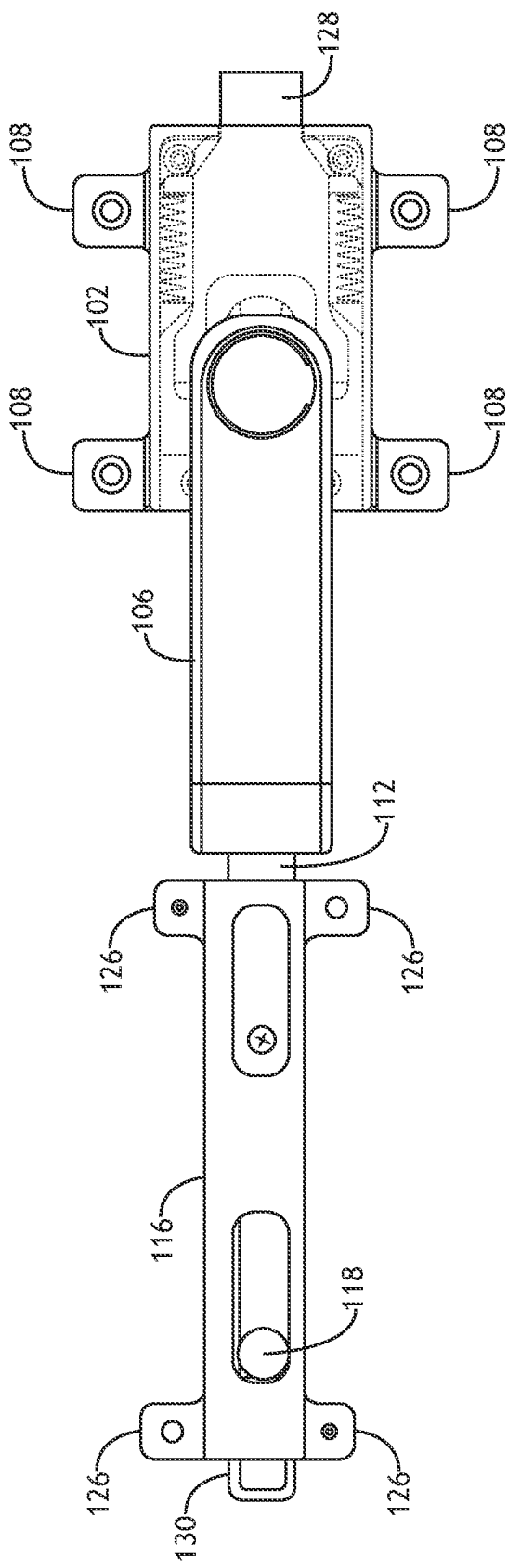
FIG. 6 is a side elevation view of the door securing device in an unlocked state, in accordance with an example embodiment of this disclosure.
Figure 7:
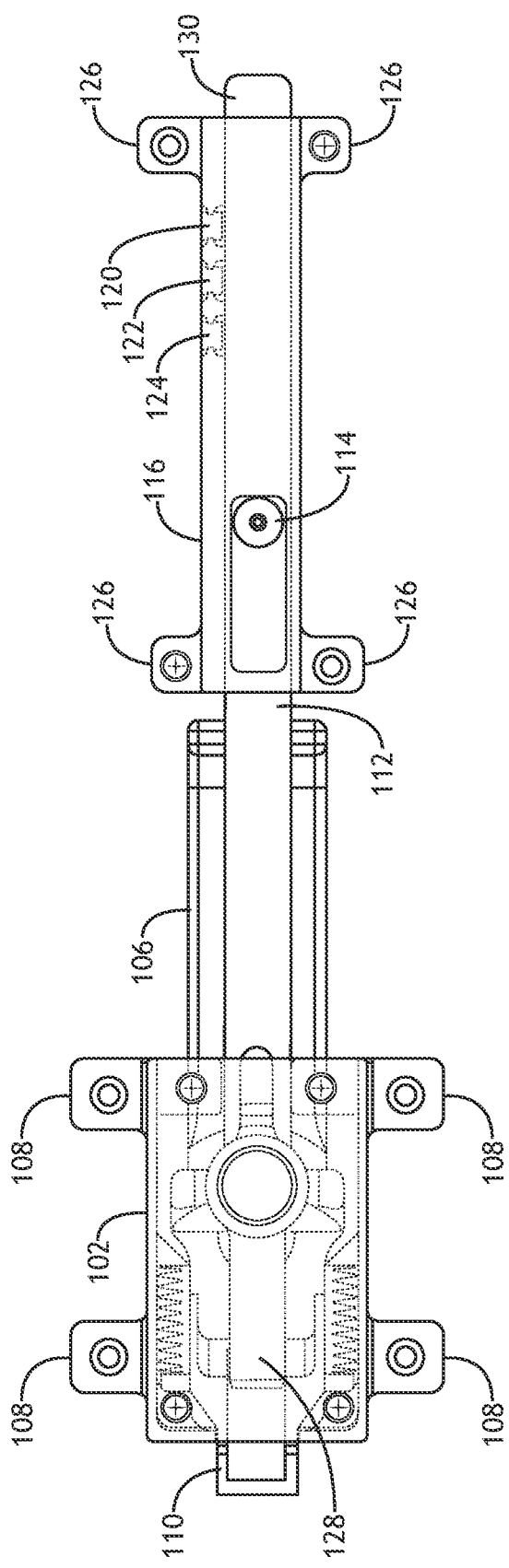
FIG. 7 is another side elevation view of the door securing device in an unlocked state, in accordance with an example embodiment of this disclosure.

In embodiments, the door securing device 100 includes a lock trigger 114 that extends through an opening on a first side of the rear housing structure 116 (or rear portion of housing 102), the "first side" being the side of the door securing device 100 that is accessible from inside a secured compartment (e.g., from inside the lavatory 200). The lock trigger 114 is coupled to the strike 112 for linearly actuating the strike 112 (and lock bolt 128) between locked and unlocked positions. For example, FIGS. 4 and 5 show the strike 112 (and lock bolt 128) in the locked position, and FIGS. 6 and 7 show the strike 112 (and lock bolt 128) in the unlocked position. In some embodiments, the rear housing structure 116 (or rear portion of housing 102) includes a cavity for a rear end 130 of the strike 112 to extend out from when the strike 112 is actuated into the unlocked position.

As shown in FIGS. 4 and 6, in some embodiments, the rear housing structure 116 (or rear portion of housing 102) further includes a second opening on a second side of rear housing structure 116 (or rear portion of housing 102) for accessing an override trigger 118, the "second side" being the side of the door securing device 100 that is accessible from outside a secured compartment (e.g., from outside the lavatory 200). The override trigger 118 is coupled to the strike 112 for linearly actuating the strike 112 (and lock bolt 128) between locked and unlocked positions in emergencies, for example, when crew must help a passenger that is locked in the lavatory 200, passed out, etc. In some embodiments, the override trigger 118 is at least partially concealed. For example, the rear housing structure 116 (or rear portion of housing 102) can be coupled to an override access flap that is configured to conceal the override trigger 118 when the override access flap is in a closed position. The override access flap and lock override actuation can be configured to be hand-operated, such that a flight attendant can easily open or remove the override access flap without any keys or tools. In other embodiments, a specific key or tool may be required to open or remove the override access flap (e.g., to prevent passengers from accessing the override trigger 118).

Figure 8:
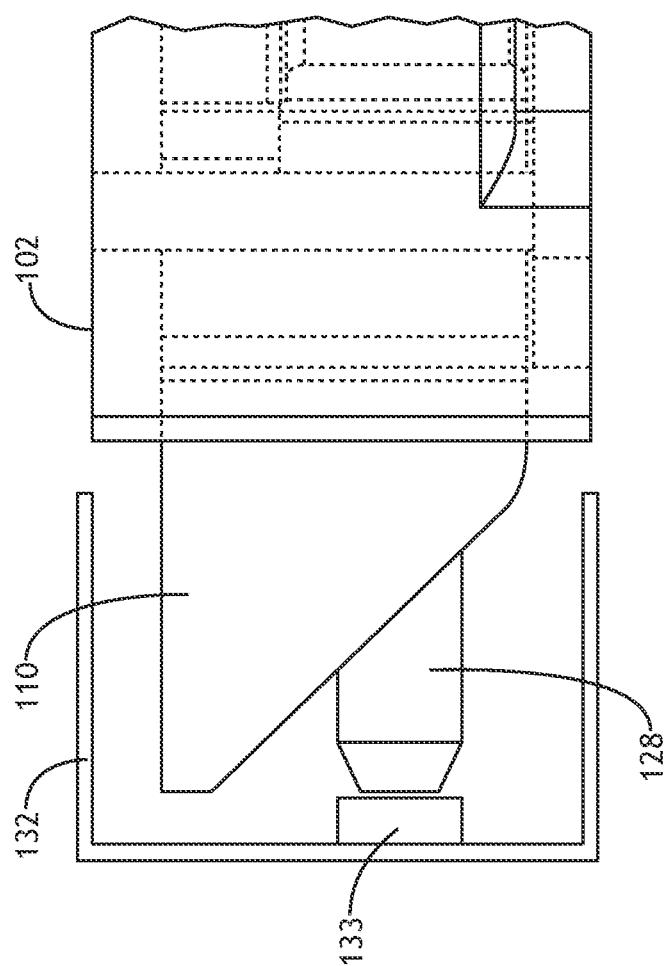
FIG. 8 is a zoomed-in view of a latch pawl and a lock bolt of the door securing device in a locked state, in accordance with an example embodiment of this disclosure.

The co-located and collinear configuration of the latch pawl 110 and the lock bolt 128 is illustrated in FIG. 8, wherein a socket 132 that receives the latch pawl 110 and the lock bolt 128 is shown. The socket 132, for example, can be embedded in a door frame or wall that surrounds the door 202 so that the door securing device 100 aligns with the socket 132 when the door 202 is closed. As shown in FIG. 8, the latch pawl 110 and the lock bolt 128 both extend into the socket 132 when the door securing device 100 is in a locked and latched state. When the door securing device 100 is unlocked, the lock bolt 128 can be retracted from the socket 132, while the latch pawl 110 is still extended into the socket 132 to keep the door securing device 100 in a latched state. When the door securing device 100 is unlocked and unlatched, the lock bolt 128 and the latch pawl 110 are both retracted from the socket 132 so that the door 202 can be opened.

In some embodiments, the socket 132 may include a switch 133 (e.g., an electrical and/or mechanical switch) aligned with the lock bolt 128 so that the lock bolt 128 can actuate (e.g., press upon) the switch 133 when the lock bolt 128 is in the locked position. The switch 133 may be positioned in such a way that the latch pawl 110 remains out of contact with the switch 133 when the latch pawl 110 is in the latched position. In this manner, the switch 133 can be selectively activated/deactivated by locking/unlocking the door securing device 100. This may be desirable for several applications, for example, to detect locked/unlocked status of the door securing device 100 and/or selectively turn on/off lights (e.g., lavatory 200 lights), etc. In some embodiments, the socket 132 can additionally or alternatively include a switch that is aligned with the latch pawl 110 so that the latch pawl 110 can actuate (e.g., press upon) the switch when the latch pawl 110 is in the latched position. This may be also be desirable, for example, to detect open/closed status of the door 202 and/or selectively turn on/off lights (e.g., lavatory 200 lights), etc.

Figure 9:
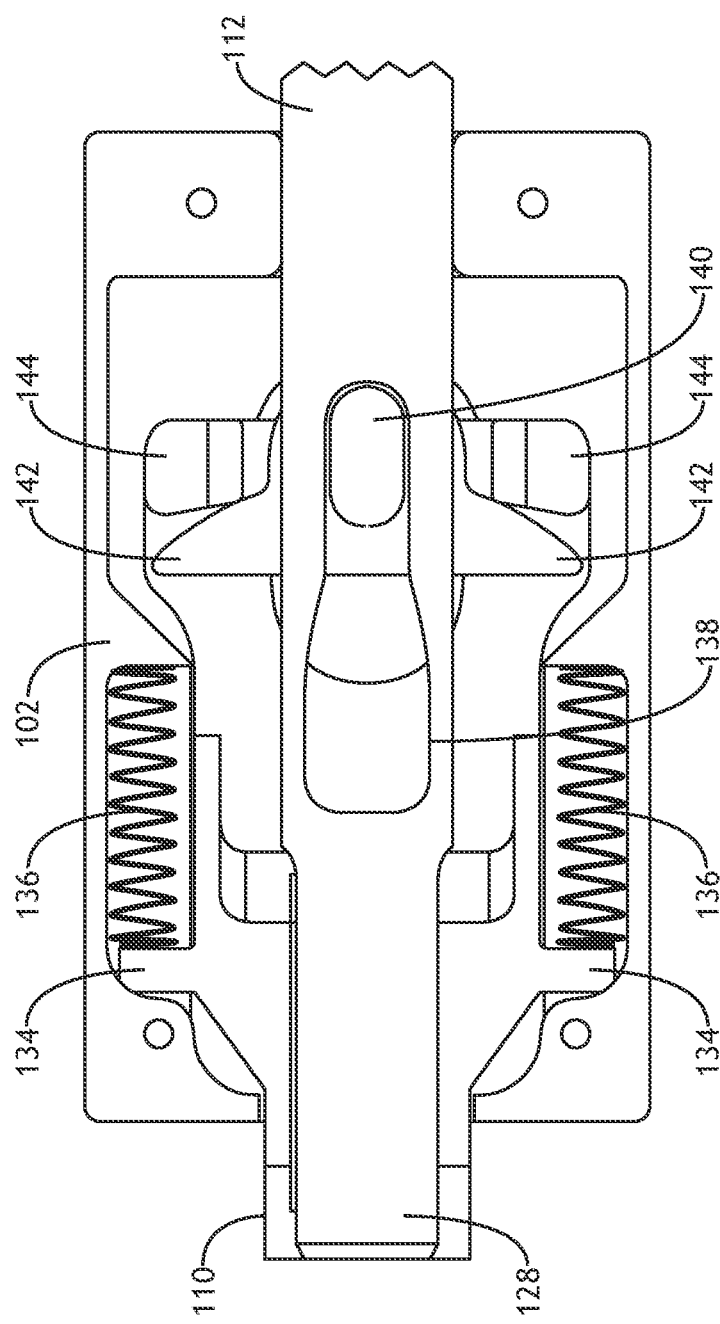
FIG. 9 is an interior view of a frontal portion the door securing device in a locked state, in accordance with an example embodiment of this disclosure.
Figure 10:
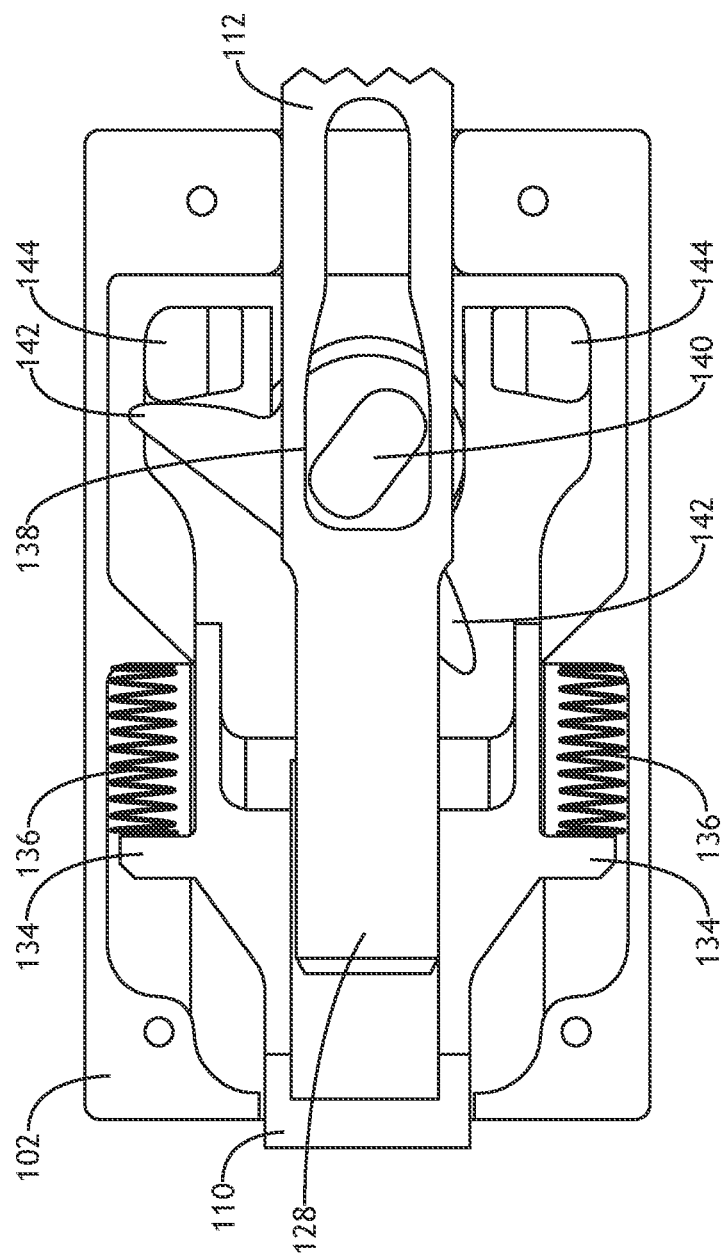
FIG. 10 is an interior view of a frontal portion the door securing device in an unlocked state, in accordance with an example embodiment of this disclosure.
Figure 11:
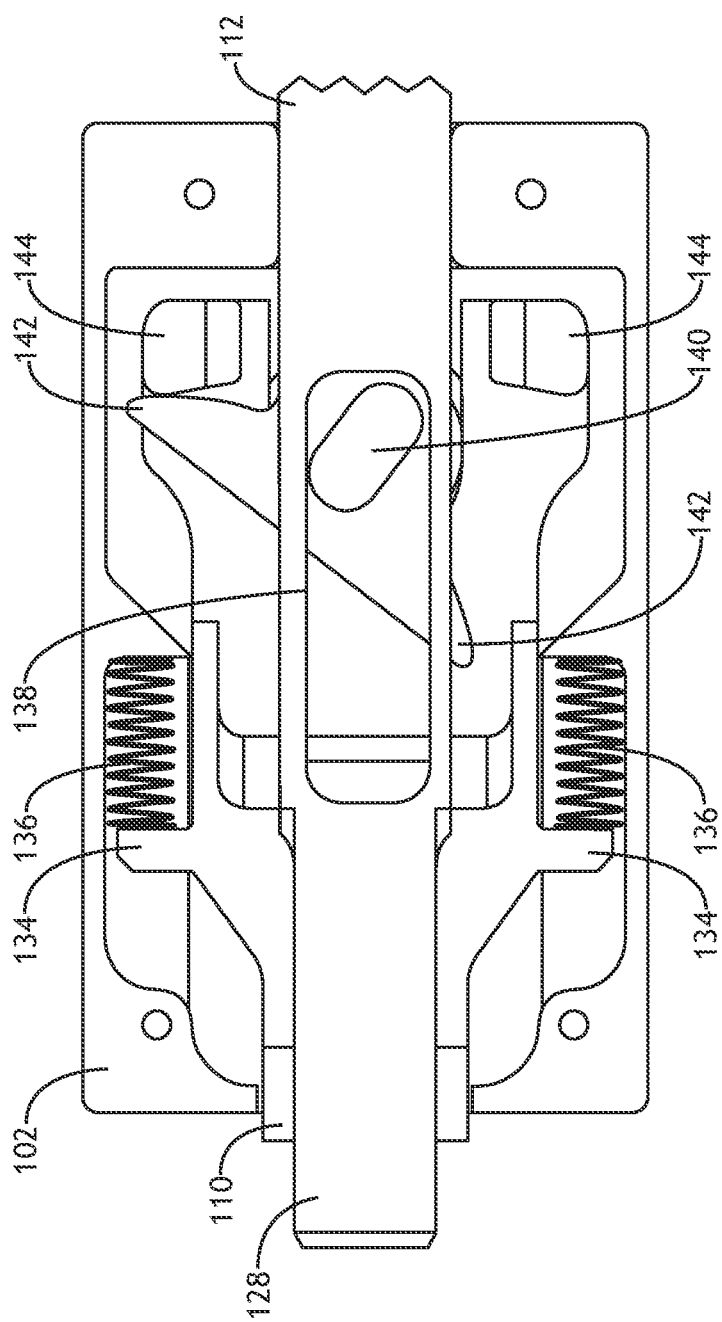
FIG. 11 is an interior view of a frontal portion the door securing device in a locked state, where the latch pawl is configured to move independent of the lock bolt, in accordance with an example embodiment of this disclosure.

FIGS. 9 through 11 illustrate internal portions of housing 102, in accordance with example embodiments of this disclosure. In embodiments, a front portion of the housing 102 (or front housing structure) may include at least one spring 136 disposed at least partially within the housing 102 and configured to bias the latch pawl 110 towards the latched position (e.g., as shown in FIG. 9). For example, in some embodiments, one or more springs 136 or other biasing members are configured to press upon one or more respective portions 134 of the latch pawl 110 to extend the latch pawl 110 from the housing 102 when no other forces are applied. The housing 102 may further include a latch cam 142 at least partially disposed within the housing 102 and configured to actuate the latch pawl 110 towards an unlatched position (i.e., by retracting the latch pawl 110) when the latch cam 142 is turned (e.g., as shown in FIG. 10). For example, at least one handle (e.g., handle 104 and/or handle 106) can be coupled to the latch cam 142 and configured to turn the latch cam 142 when the handle is pressed/pulled up or down, or when the handle (e.g., door knob) is rotated clockwise or counterclockwise. In embodiments, the latch cam 142 may include one or more projections (e.g., fins) configured to press upon one or more respective portions 144 of the latch pawl 110 to overcome the biasing spring force and retract the latch pawl 110 towards and/or into the housing 102 when the latch cam 142 is turned.

As shown in FIGS. 9 and 10, in some embodiments, the strike 112/lock bolt 128 is configured to lock or reduce a range of motion of the latch cam 142 when the strike 112/lock bolt 128 is in the locked position. For example, the strike 112 may include an opening 138 configured to surround at least a portion of a latch leaf 140 that extends from the latch cam 142 so that the latch leaf 140 is disposed within a first portion of the opening 138 when the strike 112 is in the unlocked position and within a second portion of the opening 138 when the strike 112 is in the locked position. The second portion of the opening 138 may be narrower than the first portion of the opening 138 so that the latch leaf 140 is locked or has a reduced range of motion when the strike 112 is in the locked position. Alternatively, as shown in FIG. 11, the opening 138 can be dimensioned so that the latch leaf 140 has substantially the same range of motion regardless of whether the strike 112 in the in locked position or the unlocked position. In this regard, the door securing device 100 can be configured to lock the door 202 when the lock bolt 128 is extended into the socket 132, despite the latch pawl 110 still being retractable from the socket 132 (e.g., by turning the handle 104/106 to turn the latch cam 142).

Figure 12:
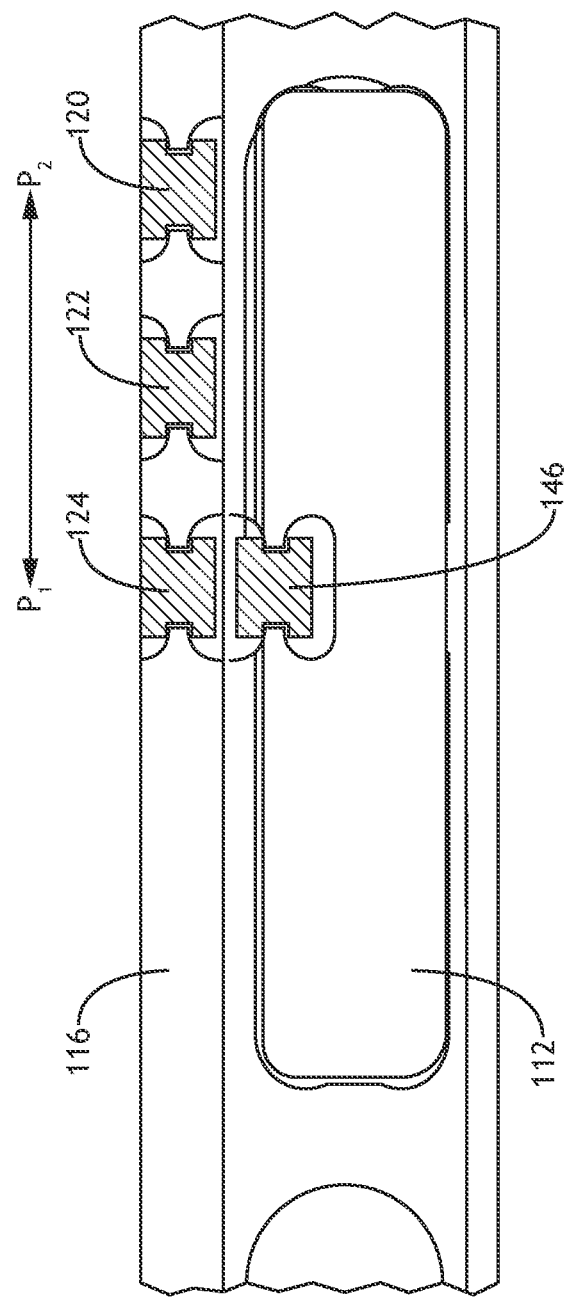
FIG. 12 is a zoomed-in view of a magnetic detent system disposed at a rear portion the door securing device, in accordance with an example embodiment of this disclosure.

In some embodiments, the lock detent system is a magnetic detent system, similar to the "Touchless Detent Lock" devices and systems described in U.S. patent application Ser. No. 16/140,910, which is incorporated herein by reference in its entirety. For example, as shown in FIG. 12, the magnetic detent system may include at least one selector magnet 146 coupled to or at least partially embedded within the strike 112 and a plurality of position magnets (e.g., magnets 120, 122, and 124) coupled to or at least partially embedded within the rear housing structure 116 (or rear portion of housing 102). The magnets may comprise permanent magnets and/or electromagnets. The position magnets include at least one magnet 120 corresponding to the unlocked position and at least one magnet 124 corresponding to the locked position. Magnets 120 and 124 are configured to attract the selector magnet 146 (e.g., to pull the strike 112 into the unlocked or locked position, respectively). For example, magnets 120 and 124 can have an inward facing polarity (e.g., N or S) that is different from (e.g., the opposite of) the inward facing polarity (e.g., S or N) of the selector magnet 146. The position magnets further include at least one other magnet 122 disposed in between magnets 120 and 124 that is configured to repel the selector magnet 146 (e.g., to prevent the strike from settling in a position that is not in either of the unlocked or locked positions). For example, magnet 122 can have an inward facing polarity (e.g., S or N) that is the same as the inward facing polarity (e.g., S or N) of the selector magnet 146 and different from (e.g., the opposite of) the inward facing polarity (e.g., N or S) of magnets 120 and 124.

Figure 13A:
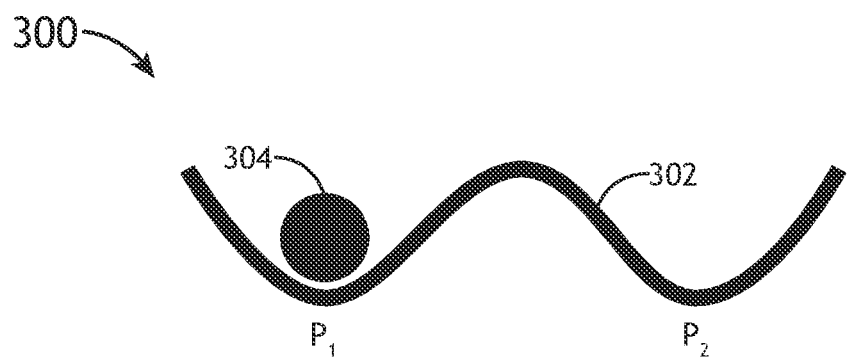
FIG. 13A is a schematic illustrating a stable position of the magnetic detent system, in accordance with an example embodiment of this disclosure.
Figure 13B:
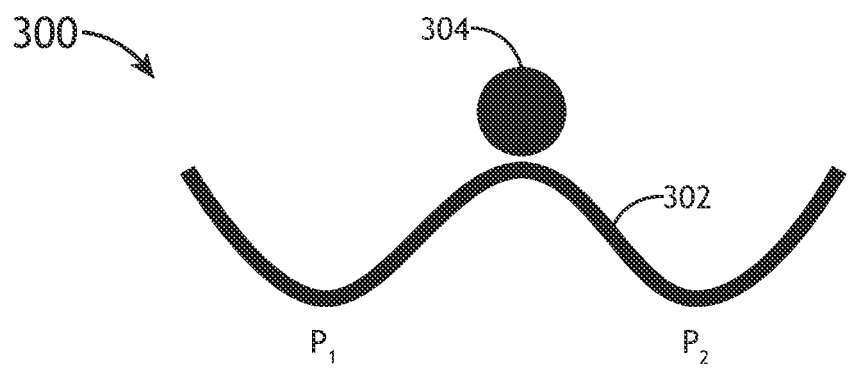
FIG. 13B is a schematic illustrating an unstable position of the magnetic detent system, in accordance with an example embodiment of this disclosure.

When the selector magnet 146 is brought in proximity to magnet 120, the attractive force between the magnets 146 and 120 causes the selector magnet 146 to be pulled towards magnet 120. In turn, this causes the strike 112 to completely transition into the discrete position P2 (i.e., the unlocked position) corresponding to magnet 120. Similarly, when the selector magnet 146 is brought in proximity to magnet 124, the attractive force between the magnets 146 and 124 causes the selector magnet 146 to be pulled towards magnet 124. In turn, this causes the strike 112 to completely transition into the discrete position P1 (i.e., the locked position) corresponding to magnet 124. In this regard, the locked and unlocked positions/states (P1 and P2) of the selector magnet 146 are "stable" states. Conversely, when the selector magnet 146 is brought in proximity to magnet 122, the repulsive force between the magnets 146 and 122 causes the selector magnet 146 to be pushed away from magnet 122 and either towards magnet 120 or magnet 124, depending on which of the magnets 120 or 124 has a stronger pull force on the selector magnet 146. This causes the strike 112 to either transition into the discrete position P2 (i.e., the unlocked position) corresponding to magnet 120 or the discrete position P1 (i.e., the locked position) corresponding to magnet 124, but in either case, the strike 112 is prevented from remaining in an "in between" position. In this regard, the "in between" position/state of the selector magnet 146 is an "unstable" state. FIGS. 13A and 13B schematically illustrate the principle by which the magnetic detent system of the door securing device 100 operates within the context of a mechanical system 300 including a ball 304 that rolls on a track 302, where the ball 304 can settle in a stable position (e.g., P1 or P2) but is likely to fall one way or the other if it is not perfectly balanced and/or if minimal force is applied in one direction or the other when the ball 304 is at the top of a hill between P1 and P2.

The strike 112 and the rear housing structure 116 (or rear portion of housing 102) may be configured to maintain a gap between the selector magnet 146 and the position magnets (e.g., magnets 120, 122, 124) to prevent direct contact between the selector magnet 146 and the position magnets (e.g., magnets 120, 122, 124). For example, the rear housing structure 116 (or rear portion of housing 102) may be configured to suspend the strike 112 so that the selector magnet 146 is a very small distance away from the position magnets (e.g., magnets 120, 122, 124) to prevent sticking due to direct contact between the magnets. This can help to facilitate smoother movement (e.g., sliding) of the strike 112 between unlocked and locked positions. Furthermore, because the action is contactless, detent wear/grinding is prevented resulting in a consistent actuation force over the life of the product that does not require adjustment. The door securing device 100 may further include brushings (e.g., plastic or fabric brushings) or bearings between the strike 112 and the rear housing structure 116 (or rear portion of housing 102) to reduce rattling of the strike 112 within the rear housing structure 116 (or rear portion of housing 102).

In some embodiments, the lock and unlock actuation forces are independent and tunable which provides design flexibility and increases perceived quality for the user. The actuation force is inversely dependent on the distance between the magnets (e.g., between the selector magnet 146 and magnet 120 or 124). In some embodiments, the magnet 120 and magnet 124 are tuned (with respect to the selector magnet 146) so that an actuation force required to transition the strike 112 from the unlocked position to the locked position is less than an actuation force required to transition the strike from the locked position to the unlocked position. For example, the magnets 120 and 124 can have selected magnet strengths and/or positions. In an example embodiment, the door securing device 100 may be configured with magnet strength and/or positioning so the force to engage the lock is in the range of 0.5 to 3 lbs. (e.g., 2 lbs.), while the force to disengage the lock is in the range of 2 to 8 lbs. (e.g., 5 lbs.). In some embodiments, one or more of the magnets (e.g., magnets 146, 120, 122, 124, etc.) may be adjustable magnets. For example, the magnets may be physically repositionable and/or electrically tunable (e.g., electromagnets).

With fixed magnets, the magnet-to-magnet distances (and therefore actuation forces) are set by the geometry of the strike 112 and rear housing structure 116 (or rear portion of housing 102) where the magnets are installed. Typical manufacturing tolerances can be invoked to achieve consistent actuation forces among many assemblies, but the assembly does not have built-in adjustability. In such embodiments, if the user wishes to reduce the engagement force, since the magnets are fixed, new components must be designed to alter the magnet-to-magnet distance.

In embodiments that employ adjustable magnets, the user may vary the actuation force without replacing parts. This may be accomplished by mounting the magnets to a threaded housing, where the magnet-to-magnet distance is varied by threading the housing in or out. Utilizing adjustable magnets can provide capability to fine tune the actuation forces and can also allow for looser tolerances on the machined parts to reduce cost.

Other modification and/or combinations of the embodiments illustrated in FIGS. 1 through 12 can be made without departing from the scope of this disclosure. For example, in some embodiments, the position magnets (e.g., magnets 120, 122, 124) may be coupled to or at least partially embedded within the strike 112 and the selector magnet (or magnets) 146 may be coupled to or at least partially embedded within the rear housing structure 116 (or rear portion of housing 102).

In the example embodiments of the door securing device 100 illustrated in FIGS. 1 through 12, the door securing device 100 is shown to include one attractive magnet (e.g., magnets 120, 124) for each of the discrete positions (e.g., unlocked, locked) with one repulsive magnet (e.g., magnet 122) in between the attractive magnets (e.g., magnets 120, 124) to prevent settling of the strike 112 in a position that is not in either of the unlocked or locked positions. However, in other embodiments, any number of attractive magnets can be used for each of the discrete positions (e.g., unlocked, locked, etc.), and similarly, any number of repulsive magnets can be used for the regions/gaps between the discrete positions. The door securing device 100 can also include any number of selector magnets 146; for example, the selector magnet 146 may be replaced with an array of selector magnets 146 without departing from the scope of this disclosure. Furthermore, any number of discrete positions can be implemented with alternating attractive magnets and repulsive magnets that include magnets (or groups of magnets) that have a first inward facing polarity (e.g., N or S) for the discrete positions and magnets (or groups of magnets) that have a second (different/opposite) inward facing polarity (e.g., S or N) for the regions/gaps between the discrete positions. In this regard, the door securing device 100 can be configured with more than two positions. For example, the door securing device 100 can be configured with a fully locked, an unlocked position, and an intermediate (e.g., partially engaged) lock position.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A door securing device, comprising:
    a strike with a lock bolt disposed at or defined by an end of the strike, the strike configured to actuate linearly along an axis;
    a latch pawl configured to surround at least a portion of the strike and linearly actuate along the same axis as the strike;
    a housing that defines a cavity configured to house at least a portion of the strike and at least a portion of the latch pawl;
    at least one spring disposed at least partially within the housing, the at least one spring configured to bias the latch pawl towards a latched position;
    a latch cam disposed at least partially within the housing, the latch cam configured to actuate the latch pawl towards an unlatched position when the latch cam is turned;
    a handle coupled to the latch cam and configured to turn the latch cam;
    a lock trigger coupled to the strike for linearly actuating the strike between locked and unlocked positions; and
    a magnetic detent system comprising:
        at least one selector magnet coupled to or at least partially embedded within the strike; and
        a plurality of position magnets coupled to or at least partially embedded within the housing, the plurality of position magnets including at least a first magnet corresponding to the unlocked position, a second magnet corresponding to the locked position, and a third magnet disposed in between the first magnet and the second magnet, wherein the first and second magnets are configured to attract the at least one selector magnet, and the third magnet is configured to repel the at least one selector magnet.

2. The door securing device of claim 1, wherein the strike includes an opening configured to surround at least a portion of a latch leaf that extends from the latch cam so that the latch leaf is disposed within a first portion of the opening when the strike is in the unlocked position and within a second portion of the opening when the strike is in the locked position.

3. The door securing device of claim 2, wherein a second portion of the opening is narrower than the first portion of the opening so that the latch leaf is locked or has a reduced range of motion when the strike is in the locked position.

4. The door securing device of claim 1, wherein the housing comprises a front portion and a rear portion, wherein the latch pawl and the lock bolt are configured to at least partially extend from the front portion of the housing, and wherein the magnetic detent system is disposed within the rear portion of the housing.

5. The door securing device of claim 4, wherein the rear portion of the housing includes a first opening on a first side of the rear portion of the housing for accessing the lock trigger.

6. The door securing device of claim 5, wherein the rear portion of the housing further includes a second opening on a second side of the rear portion of the housing for accessing an override trigger, the override trigger being coupled to the strike.

7. The door securing device of claim 4, wherein the front portion and the rear portion are separate housing structures.

8. An aircraft lavatory door system, comprising:
    an aircraft lavatory door; and
    a door securing device coupled to the aircraft lavatory door, the door securing device comprising:
        a strike with a lock bolt disposed at or defined by an end of the strike, the strike configured to actuate linearly along an axis;
        a latch pawl configured to surround at least a portion of the strike and linearly actuate along the same axis as the strike;
        a housing that defines a cavity configured to house at least a portion of the strike and at least a portion of the latch pawl;

at least one spring disposed at least partially within the housing, the at least one spring configured to bias the latch pawl towards a latched position;

a latch cam disposed at least partially within the housing, the latch cam configured to actuate the latch pawl towards an unlatched position when the latch cam is turned;

a handle coupled to the latch cam and configured to turn the latch cam;

a lock trigger coupled to the strike for linearly actuating the strike between locked and unlocked positions; and a magnetic detent system comprising:
   at least one selector magnet coupled to or at least partially embedded within the strike; and
   a plurality of position magnets coupled to or at least partially embedded within the housing, the plurality of position magnets including at least a first magnet corresponding to the unlocked position, a second magnet corresponding to the locked position, and a third magnet disposed in between the first magnet and the second magnet, wherein the first and second magnets are configured to attract the at least one selector magnet, and the third magnet is configured to repel the at least one selector magnet.

9. The aircraft lavatory door system of claim 8, wherein the strike includes an opening configured to surround at least a portion of a latch leaf that extends from the latch cam so that the latch leaf is disposed within a first portion of the opening when the strike is in the unlocked position and within a second portion of the opening when the strike is in the locked position.

10. The aircraft lavatory door system of claim 9, wherein a second portion of the opening is narrower than the first portion of the opening so that the latch leaf is locked or has a reduced range of motion when the strike is in the locked position.

11. The aircraft lavatory door system of claim 8, wherein the housing comprises a front portion and a rear portion, wherein the latch pawl and the lock bolt are configured to at least partially extend from the front portion of the housing, and wherein the magnetic detent system is disposed within the rear portion of the housing.

12. The aircraft lavatory door system of claim 11, wherein the rear portion of the housing includes a first opening on a first side of the rear portion of the housing for accessing the lock trigger.

13. The aircraft lavatory door system of claim 12, wherein the rear portion of the housing further includes a second opening on a second side of the rear portion of the housing for accessing an override trigger, the override trigger being coupled to the strike.

14. The aircraft lavatory door system of claim 11, wherein the front portion and the rear portion are separate housing structures.

15. A system for latching and locking, comprising:
   a strike with a lock bolt disposed at or defined by an end of the strike, the strike configured to actuate linearly along an axis;
   a latch pawl configured to surround at least a portion of the strike and linearly actuate along the same axis as the strike;
   a latch cam configured to actuate the latch pawl from a latched position to an unlatched position when the latch cam is turned; and
   a magnetic detent system comprising:
     at least one selector magnet coupled to or at least partially embedded within the strike; and
     a plurality of position magnets coupled to or at least partially embedded within a housing that surrounds at least a portion of the strike, the plurality of position magnets including at least a first magnet corresponding to the unlocked position, a second magnet corresponding to the locked position, and a third magnet disposed in between the first magnet and the second magnet, wherein the first and second magnets are configured to attract the at least one selector magnet, and the third magnet is configured to repel the at least one selector magnet.

16. The system of claim 15, wherein the strike includes an opening configured to surround at least a portion of a latch leaf that extends from the latch cam so that the latch leaf is disposed within a first portion of the opening when the strike is in a unlocked position and within a second portion of the opening when the strike is in a locked position.

17. The system of claim 16, wherein second portion of the opening is narrower than the first portion of the opening so that the latch leaf is locked or has a reduced range of motion when the strike is in the locked position.

* * * * *